United States Patent
Cho et al.

(10) Patent No.: US 6,936,562 B2
(45) Date of Patent: Aug. 30, 2005

(54) HYDROTHERMALLY STABLE CATALYST FOR IMPROVED LEAN NOX REDUCTION

(75) Inventors: Byong Kwon Cho, Rochester Hills, MI (US); Richard J. Blint, Shelby Township, MI (US); Ayyappan Subbiah, Warren, MI (US)

(73) Assignee: General Motors Corporation, Detroit, MI (US)

(*) Notice: Subject to any disclaimer, the term of this patent is extended or adjusted under 35 U.S.C. 154(b) by 67 days.

(21) Appl. No.: 10/654,800

(22) Filed: Sep. 4, 2003

(65) Prior Publication Data

US 2004/0043891 A1 Mar. 4, 2004

Related U.S. Application Data

(62) Division of application No. 09/982,583, filed on Oct. 18, 2001, now Pat. No. 6,645,448.

(51) Int. Cl.[7] .............................................. B01J 29/06
(52) U.S. Cl. ...................................... 502/64; 502/60
(58) Field of Search ........................ 502/60, 66, 74, 502/64

(56) References Cited

U.S. PATENT DOCUMENTS 5,118,483 A   6/1992  Barri ........................ 423/328
6,514,470 B1  2/2003  Ott et al. ................. 423/239.1
6,645,448 B2 * 11/2003 Cho et al. ................ 423/239.2

FOREIGN PATENT DOCUMENTS

EP        0 706 984      * 4/1996

OTHER PUBLICATIONS

J. W. Kim, J. E. Yie, Synthesis of SUZ–4 and its application with Lean–Burn deNOx Catalyst, Mar. 6, 2002.

M. A. Asensi, M. A. Camblor, A. Martinez, Zeolite SUZ_4: reproducible synthesis . . . , Microporous and Mesoporous Materials, 1999, pp. 427–436, Elsevier Science B. V.

* cited by examiner

Primary Examiner—Christina Johnson
(74) Attorney, Agent, or Firm—Kathryn A. Marra

(57) ABSTRACT

Certain metal-exchanged SUZ-4 zeolites have been prepared that have catalytic activity for the reduction of NOx in the exhaust of a hydrocarbon or alcohol fueled engine operated under fuel lean conditions. Initially the SUZ-4 zeolite contains alkali metal cations such as $Li^+$, $Na^+$, $K^+$ and/or $Cs^+$. These alkali metal cation-containing zeolites are partially exchanged with at least one of copper (II), silver (I), iron (III) or cobalt (II) ions. The resulting partially exchanged SUZ-4 zeolites display such activity and are stable under extreme hydrothermal aging conditions.

2 Claims, 4 Drawing Sheets

HYDROTHERMALLY STABLE CATALYST FOR IMPROVED LEAN NOX REDUCTION

This application is a divisional of application Ser. No. 09/982,583, filed Oct. 18, 2001 now U.S. Pat. No. 6,645,448.

TECHNICAL FIELD

This invention pertains to the catalytic reduction of nitrogen oxide and dioxide (collectively NOx) in the exhaust gas from a lean burn hydrocarbon-fueled engine or under similar oxygen and water containing atmosphere. More particularly, this invention pertains to the use of a hydrothermally stable zeolite in cation-exchanged form for such purpose.

BACKGROUND OF THE INVENTION

In order to further improve the fuel efficiency of hydrocarbon fuel engines there is interest in operating the engine in a fuel-lean combustion mode. For gasoline engines this means introducing an air/fuel mixture at a ratio of about seventeen to twenty three parts by weight of air per part of gasoline. For diesel engines the air to fuel mass ratio is even higher. The purpose of fuel lean operation is to obtain more complete combustion of the fuel.

Attractive as the lean-burn engines have become lately for their superior fuel efficiency, there remains a major technical barrier to the automotive application of lean-burn engine technology. It is associated with NOx emission in the engine exhaust. The exhaust gas from a lean-burn gasoline engine is typically at a temperature of 300° to 600° C. during warmed up engine operation. And the exhaust contains water, small amounts of carbon monoxide and unburned hydrocarbons (e.g., ethylene), nitrogen, and nitrogen oxides (NO and $NO_2$). The challenge is to promote the reduction of NOx in this chemically oxidizing environment.

The traditional three-way catalysts while active for NOx reduction under stoichiometric exhaust conditions, are not effective in reducing NOx under highly oxidizing conditions prevailing in the lean-burn engine exhaust. Lean-NOx reduction technologies currently available are not sufficiently effective to meet future stringent emission standards either. This has prompted intensive and extensive R&D activities around the world for improved lean-NOx reduction technology.

Among a few different approaches for lean-NOx reduction, the selective catalytic reduction of NOx using unburned hydrocarbons (HC-SCR) as reductants has been attracting the most attention. There are quite a few known lean-NOx reduction catalysts for the HC-SCR process. Among those reported in the literature, Cu/ZSM-5 zeolite is probably the most studied catalyst for high temperature applications, whereas Pt/ZSM-5 is for low temperature applications. In most lean-NOx catalysts, zeolites are used as catalyst support on which the active metals are ion exchanged. Among many different zeolites, the ZSM-5 zeolites with high silica content have been preferentially used for lean-NOx catalysts. Unfortunately, however, all those catalysts suffer from the combination of the narrow effective operating temperature window and insufficient catalytic activity and hydrothermal stability.

All zeolite-based catalysts, Cu/ZSM-5 in particular, have major problems due both to hydrothermal degradation and negative sensitivity towards water vapor and $SO_2$. In general, the permanent loss of activity has been attributed by investigators to (a) degradation of the support, (b) irreversible loss of $Cu^{2+}$ from the zeolite framework or (c) combination of the above. The $Cu^{1+}$ is known to be the active catalytic site for both NO decomposition and NO reduction with hydrocarbon. The inter-conversion between $Cu^{1+}$ and $Cu^{2+}$ depends on the reaction conditions including temperature and the types of reductant. Hydrothermal de-alumination of the zeolite framework has been a major issue in the deactivation of the catalyst. It appears that deactivation is mainly caused by migration of $Cu^{2+}$ ions to locations inside ZSM-5 where their reduction to $Cu^{1+}$ is more difficult. The above mentioned studies clearly reveal that Cu/ZSM-5 deactivates substantially even under relatively mild conditions and indicate that a dramatic increase in hydrothermal stability is required for the catalysts if they are to be used in the automotive application. Thus, the search continues for better lean-NOx catalysts, which requires both more stable supports and more active catalytic chemical ingredients.

Accordingly, it is an object of this invention to provide a stable and effective catalyst for reduction of NOx in a lean burn exhaust such as from a hydrocarbon-fueled automotive vehicle engine.

SUMMARY OF THE INVENTION

This invention utilizes certain metal ion exchanged SUZ-4 zeolites to catalyze the reduction of nitrogen oxides in a high temperature gas mixture also containing nitrogen, water and small amounts of carbon monoxide and unburned hydrocarbons. U.S. Pat. No. 5,118,483 to Barri, entitled Crystalline (Metallo) Silicates and Germanates-SUZ-4 describes the synthesis of a family of materials having a porous crystalline structure. Some of the synthetic aluminosilicate members (zeolites) of this family are useful in the practice of this invention.

The suitable SUZ-4 zeolite starting materials are crystalline aluminosilicates. They have an empirical formula in their dehydrated form of $M_2O:Al_2O_3:ySiO_2$. The cation M in the SUZ-4 starting material is preferably an alkali metal cation selected from $Li^+$, $Na^+$, $K^+$ or $Cs^+$ and y has a value such that the ratio of Si to Al is in the range of about 5.1 to 6. In general, zeolites have complex crystalline structures with pores and/or channels of specific and uniform dimensions. These structures are largely dependent upon the synthesis of the zeolite. And retention of these structures during NOx reduction operating conditions is necessary for stability of a catalyst. Thus the '483 patent states the process for the preparation of SUZ-4 materials requires the presence of tetraethylammonium hydroxide or halide or its precursor or reaction product as a template, and that other nitrogenous materials may be present in the reaction mixture. These SUZ-4 synthesis components are, of course, in addition to suitable quantities of alumina and silica precursors and the M cation(s).

SUZ-4 zeolites have been found to be surprisingly stable at temperatures up to 800° C. in a flowing nitrogen atmosphere containing five percent oxygen and 2.5 percent water. Since all other known zeolites, including ZSM-5, have experienced degradation under these extreme hydrothermal conditions it was decided to further evaluate certain cation exchanged SUZ-4 zeolites as catalysts for the reduction of nitrogen oxides under like conditions representative of the exhaust of a lean burn automotive engine.

Potassium SUZ-4 zeolite was synthesized. Copper (II), silver (I), iron (III) and cobalt (II) ion exchanged SUZ-4 zeolites were prepared, each by the aqueous ion exchange method. In each case a portion of the potassium ion content in the SUZ-4 zeolite was replaced with one of these cations.

Each of these cation exchanged materials was tested for catalytic activity in synthetic $C_2H_4$—NO—$O_2$ feedstreams (helium background) using a packed bed reactor under steady state conditions over a wide temperature range from 200 to 650° C.

Each of these cation exchanged SUZ-4 zeolites were effective in reducing nitrogen oxides in the oxygen containing gas that simulated a lean burn exhaust. The copper exchanged SUZ-4 material was especially effective in reducing nitrogen oxides over a broad range of operating temperatures even in the presence of water and/or $SO_2$. The optimum range of copper (II) ion exchange was from 29 to 42% of the ion exchange capacity of the potassium SUZ-4 zeolite. Potassium ions remained as the balance, 58 to 71%, of the cation content.

In addition to their catalytic activity in reducing nitrogen oxides in a hydrocarbon containing but oxygen rich environment, these cation substituted SUZ-4 zeolites retained their effectiveness after hydrothermal aging.

Other objects and advantages of the invention will become apparent from a description of preferred embodiments which follows.

DESCRIPTION OF PREFERRED EMBODIMENTS

Preparation of the Catalysts

Figure 1A:
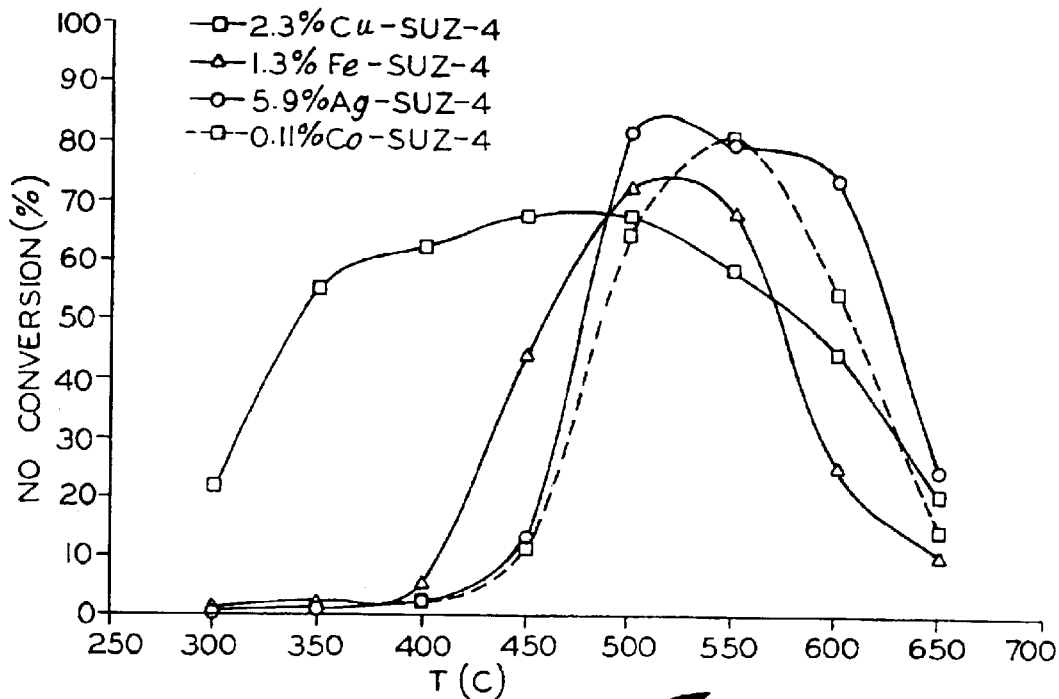
FIG. 1A is a graph of data showing NO conversion over a temperature range from 300 to 650° C. for 2.3 weight % Cu/SUZ-4, 1.3% Fe/SUZ-4, 5.9% Ag/SUZ-4 and 0.11% Co/SUZ-4.

SUZ-4 was synthesized according to the following procedure. 33.55 g KOH pellets (86% KOH, 14% water by weight) were dissolved in 170 g distilled water in a plastic bottle. 1.888 g of Al pellets were added with the bottle loosely capped ($H_2$ gas is evolved), and the solution was stirred overnight so that the Al pellets were completely dissolved to form a clear solution. A second solution containing 91.13 g tetraethylammonium hydroxide (35% aqueous solution by weight), 175 g Dupont Ludox AS-40 (40% colloidal $SiO_2$ by weight), and 145.2 g distilled water was prepared, and then the two solutions were mixed slowly with stirring to form an easily flowing gel. The gel was transferred to a one-liter autoclave and the solution was heated to 150° C. under autogenous pressure with stirring for four days. The product was retrieved by filtration, washed to pH<10, and dried at 120° C. for two hours. Finally, the product was calcined by first treating in flowing argon gas by heating at 10° C./min to 550° C., then switching in 20% $O_2$ and holding at 550° C. for 4 hours. The elemental analysis of a typical SUZ-4 zeolite sample resulted in Si/Al ratio of 5.3 and potassium of 6.6 wt %.

Copper (II)-, silver (I)-, iron (III)-, and cobalt (II)-exchanged SUZ-4 zeolites were prepared by the aqueous ion exchange method. In the case of silver ion exchange, special precaution was taken to avoid the interaction of $Ag^+$ ions with light. For the exchange of iron, the ion exchange mixture was purged with helium gas to remove any dissolved oxygen gas prior to the ion exchange, thereby avoiding the oxidation of iron (II) to iron (III) during the ion exchange process. (Note that the ion exchange of Fe was carried out in the form of $Fe^{2+}$ which subsequently converted to $Fe^{3+}$ on calcination.) The exchange was carried out under vigorous stirring, using a diluted aqueous solution of copper acetate, silver nitrate, iron (II) chloride or cobalt sulfate respectively in a solid-to-liquid ratio of 1 g/100 ml at room temperature for 24 hours. The ion-exchanged zeolites were then filtered and washed thoroughly with de-ionized water at room temperature before drying at 120° C. overnight. The dried ion-exchanged zeolites were then calcined in air at 500° C. for 6 h. The benchmark 2.3 wt % Cu/ZSM-5 was obtained by copper acetate ion exchange on Na-ZSM-5 (obtained from the PQ Corporation) followed by drying at 120° C. and calcination at 500° C. The standard aging was done by treating the sample at 800° C. for 4 hours with a flowing gas mixture containing 5% oxygen and 2.5% water vapor in nitrogen.

Testing and Evaluation

Hydrothermal Stability

Magic angle spinning (MAS) NMR experiments were done for fresh and aged ZSM-5, SUZ-4 and Cu/SUZ4 materials. De-alumination can easily be detected by measuring the loss of tetrahedral aluminum from the framework using MAS NMR measurements. For these NMR experiments, each zeolite sample was spread onto a thin layer in an aluminum drying pan and re-hydrated in a humidifier at 100% RH at atmospheric pressure for 48 hours. Solid state $^{27}Al$ MAS NMR spectra were obtained in 400 MHz Bruker instrument using a direct polarization pulse sequence (automation program "ZG"). About 3,000 to 10,000 scans were signal-averaged to produce a spectrum. Each sample was first examined neat and then subsequently examined after addition of ~2 wt % aluminum nitride (AlN) as an internal standard. In order to reduce the effects of artifacts due to MAS spinning speed, all of the analyses were run using the same spinning speed (10 KHz). In addition, a previously prepared "reference" sample made with bulk ZSM-5 of known Al content plus AlN was also analyzed. This "reference" sample was used to calculate the Al saturation coefficient for AlN under the current spectrometer experimental conditions.

Each sample was analyzed twice, using two different experimental methods. The first method was an attempt to collect data in "quantitative" mode (i.e., with no saturation). Thirty-two scans were collected with a delay time of 2 minutes between scans. No dummy scans were used with this method. The second method is a "non-quantitative" mode, which depends on calibrating the saturation coefficient for AlN. A delay time of 1 second was used, with 100 dummy scans introduced to establish equilibrium saturation conditions prior to collection of the analytical data. The power setting used was PL1=2.0 dB with a 90 degree pulse (P1=2.5 $\mu$sec).

With respect to the fresh and aged ZSM-5, SUZ-4 and Cu/SUZ-4 materials, chemical shifts of 60 ppm and 0 ppm were assigned to the tetrahedral and octahedral aluminum respectively.

The NMR spectra showed a slight decrease (~29% loss) in the MAS NMR tetrahedral aluminum peak intensity between the fresh and aged SUZ-4, with no octahedral aluminum peaks. The fresh and aged 2.3 wt. % Cu/SUZ-4 catalysts did not lose any tetrahedral Al. However, the aged ZSM-5 lost 65% of its tetrahedral Al compared to the fresh ZSM-5 material.

XRD patterns of the fresh/aged SUZ-4 and Cu/SUZ-4 were prepared. They showed no detectable change in the background due to degradation of the material as well as no detectable formation of CuO in the XRD patterns of the fresh/aged Cu/SUZ-4 catalysts. All the four XRD patterns could be indexed in orthorhombic crystal system. The cell parameters are for the fresh SUZ-4: a=18.914, b=14.246, c=7.443 Å, aged SUZ-4: a=18.918, b=14.233, c=7.452 Å, fresh 2.3 wt % Cu/SUZ-4: a=18.858, b=14.198, c=7.442 Å and aged 2.3 wt. % Cu/SUZ-4: a=18.855, b=14.201, c=7.490 Å. The XRD results on the fresh/aged SUZ-4 and Cu/SUZ-4 materials reveal that there were no measurable structural changes on hydrothermal aging. These results were surprising considering the instability of other known zeolites like Cu/ZSM-5.

Catalytic Activity

The NO reduction activity of the catalyst was measured in laboratory $C_2H_4$—NO—$O_2$ feedstreams (He background) using a packed-bed reactor under steady-state conditions. Catalytic activity was typically characterized by monitoring reactor outlet concentrations as a function of temperature (increased from 200 to 600° C.) in a feedstream of fixed composition. Each catalyst sample powder was compressed into a disk using a die at 10-ton pressure, annealed in air at 500° C. for 20 h. Each catalyst disk was then crushed, ground and screened to 70–80 mesh sizes for use in the reactor experiments.

The reactor was made of 0.635 cm (o.d.) quartz tube packed with the catalyst particles. Before each experimental run for the activity measurement, the catalyst was pretreated with the reaction mixture for 2 h at 500° C. The reactor temperature was measured at the inlet of the catalyst bed and controlled electronically with a typical precision of +/−1° C. The temperature rise within the reactor was minimal (<2° C.) under all experimental conditions, indicating that the gas-phase temperature of the reactor remained essentially isothermal. The gas flow rate through the reactor was measured and controlled by electronic mass flow controllers, with the total gas flow rate fixed at 50 cm$^3$/min. The effluent gas analysis was made with the Agilent M-Series Micro-GC equipped with a Mol Sieve 5A column (for the analysis of $N_2$, $O_2$, CO) and PoraPlot Q column (for the analysis of $C_2H_4$, $N_2O$, $CO_2$). $N_2O$ production was negligible in the present study. A chemiluminescence analyzer was used to measure the concentrations of NO and NOx (NO+$NO_2$).

The amount of Cu/SUZ-4 was adjusted to have the same amount of Cu as in 2.3 wt. % Cu/ZSM-5 (benchmark) samples for the comparison purposes. Among the SUZ-4 samples, the amount of metal concentration was adjusted for each experiment such that every sample had the same amount of metal exchanged. The ion exchange level is calculated assuming that one copper (II) ion can be exchanged with two potassium (I) or sodium (I) ions or other alkali metal cations.

In order to study the influence of metals on lean-NOx catalysis, various metal-ions such as Cu (1.9–5.5 wt %), Ag (5.9 wt %), Co (0.11 wt. %) and Fe (1.3 wt. %) were ion-exchanged onto SUZ-4 in place of a portion of the potassium ions. The level of exchange was in the range of 24–70, 23, 28 and 2% for Cu, Ag, Fe and Co respectively. (For equitable comparison of catalytic activity, the level of ion exchange for Ag, Fe and Co was aimed at 29–42% of the total exchange capacity which exhibited the maximum NOx conversion performance for Cu. However, the actual exchange levels obtained were slightly off the target level; 23% for Ag and 28% for Fe. The actual exchange level of Co (2%) could not even come close to the target level.)

FIG. 1A shows the NO conversion as a function of temperature for different cations exchanged. A major difference in the NO conversion performance between 2.3 wt % Cu/SUZ-4 and the other metal-exchanged SUZ-4 is in the reaction lightoff temperature (RLT) as defined as the temperature required for 50% conversion: The lightoff temperature for NO conversion over Cu/SUZ-4 is around 325° C., while it is 450–475° C. for the Ag, Co and Fe-exchanged SUZ-4 catalysts. Another noticeable difference is that the NO conversion activity of Cu/SUZ-4 maintains a much wider temperature (300–600° C.) window compared with the other metal-containing SUZ-4 catalysts. Interestingly, Fe, Co and Ag can be more active than Cu for NO conversion in the high temperature range above 500° C.

Figure 1B:
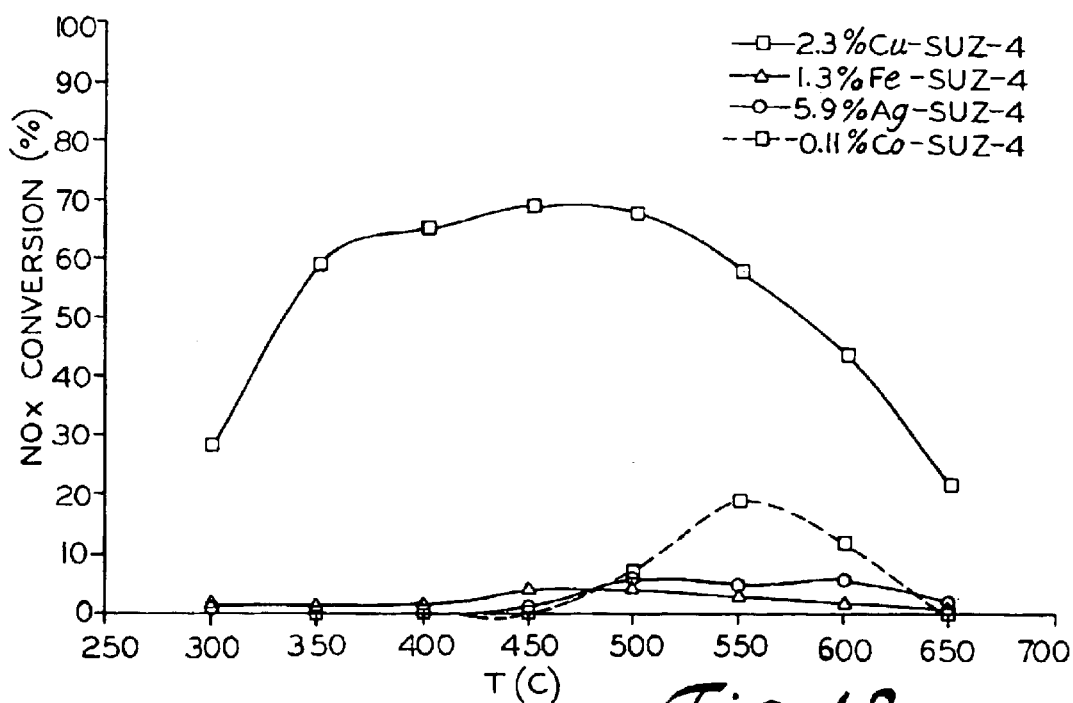
FIG. 1B is a graph of data showing NOx conversion over a temperature range from 300 to 650° C. for 2.3 weight % Cu/SUZ-4, 1.3% Fe/SUZ-4, 5.9% Ag/SUZ-4 and 0.11% Co/SUZ-4.

FIG. 1B compares the NOx (NO/$NO_2$) conversion. Similar to its NO conversion performance, the NOx conversion performance of 2.3 wt. % Cu/SUZ-4 maintains a wide temperature window ranging from 350 to 600° C., with a maximum conversion of 68% at 450° C. Surprisingly, the NOx conversion performance of the other metal-exchanged SUZ-4 catalysts is almost negligible except for Co around 550° C.

Figure 1C:
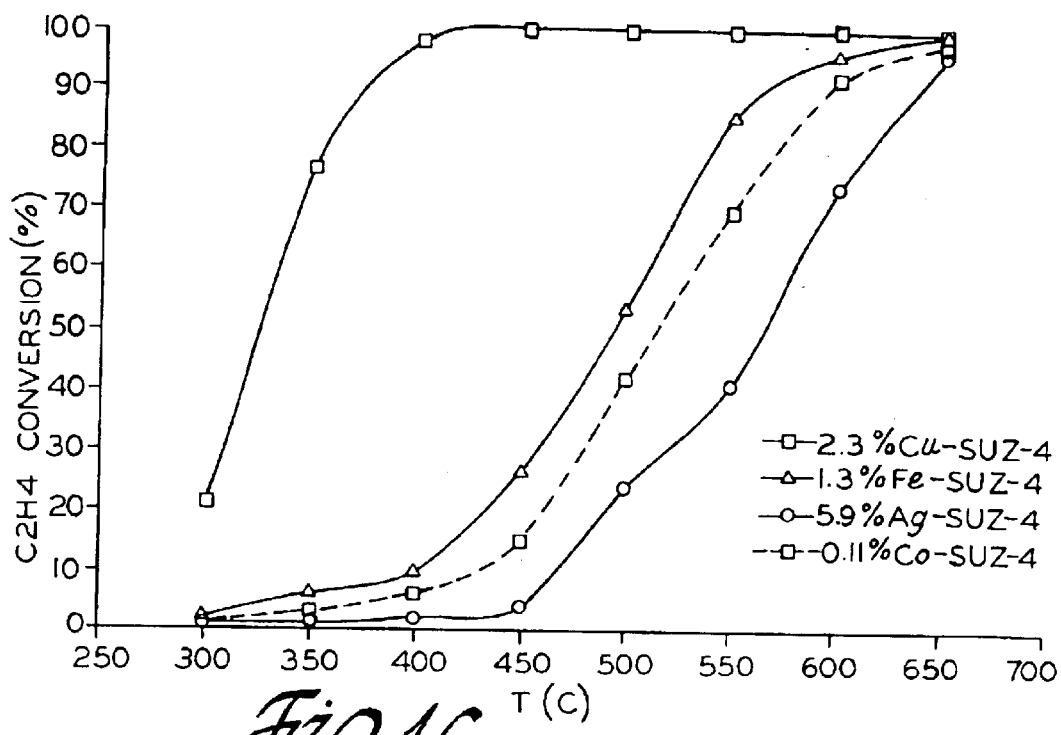
FIG. 1C is a graph of data showing ethylene conversion over a temperature range from 300 to 650° C. for 2.3% (by weight) Cu/SUZ-4, 1.3% Fe/SUZ-4, 5.9% Ag/SUZ-4 and 0.11% Co/SUZ-4.

Presented in FIG. 1C is the ethylene (hydrocarbon, HC) conversion. The lightoff temperature for HC conversion over Cu/SUZ-4 is 325° C., much lower than that over the other catalysts, which is consistent with the earlier observations for both NO and NOx conversions in FIGS. 1A and 1B.

Different amounts of Cu were loaded by successive aqueous ion exchange. Chemical analyses show that 1.9, 2.3, 2.8, 3.3 and 5.5 wt. % Cu loadings (corresponding to 24, 29, 36, 42 and 70% ion exchange level) were obtained on SUZ-4.

Figure 2:
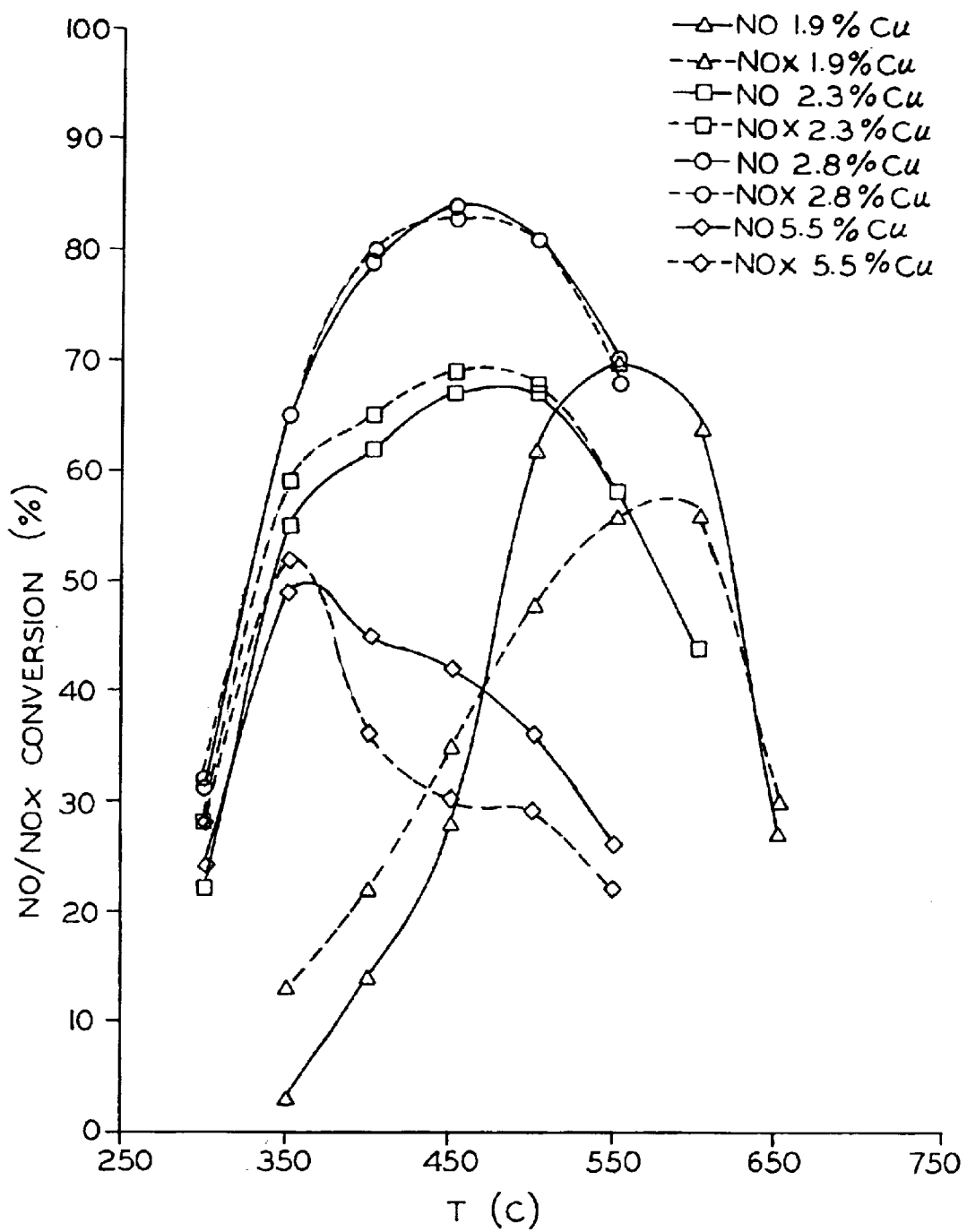
FIG. 2 is a graph of data showing the effect of Cu loading on SUZ-4 for NO and NOx conversion.

Activity measurements with these samples (see FIG. 2) show that increasing the copper loading on SUZ-4 lowers the lightoff temperature for NO conversion. The lightoff temperature is around 475° C. for 1.9 wt % Cu/SUZ-4, while it is around 325° C. for both 2.3 wt % and 2.8 wt % Cu/SUZ-4. The lightoff temperature does not change beyond 2.3% copper loading. For the loading of 2.3–3.3 wt % (29–42% ion-exchange capacity) copper on SUZ-4, the activity is maintained over a wide temperature window (i.e., 300–600° C.) reaching a maximum NO conversion of 70–84% at around 450° C. In the 5.5 wt % (70% ion-exchange) Cu/SUZ-4 catalyst, the activity drops after reaching a maximum of 55% NO conversion at around 350° C. Clearly, there is an optimum level of metal exchange (and metal loading) in the zeolite SUZ-4. For copper containing SUZ-4 the optimum level of ion exchange lies between 29 and 42% of the ion-exchange capacity of SUZ-4.

Figure 3:
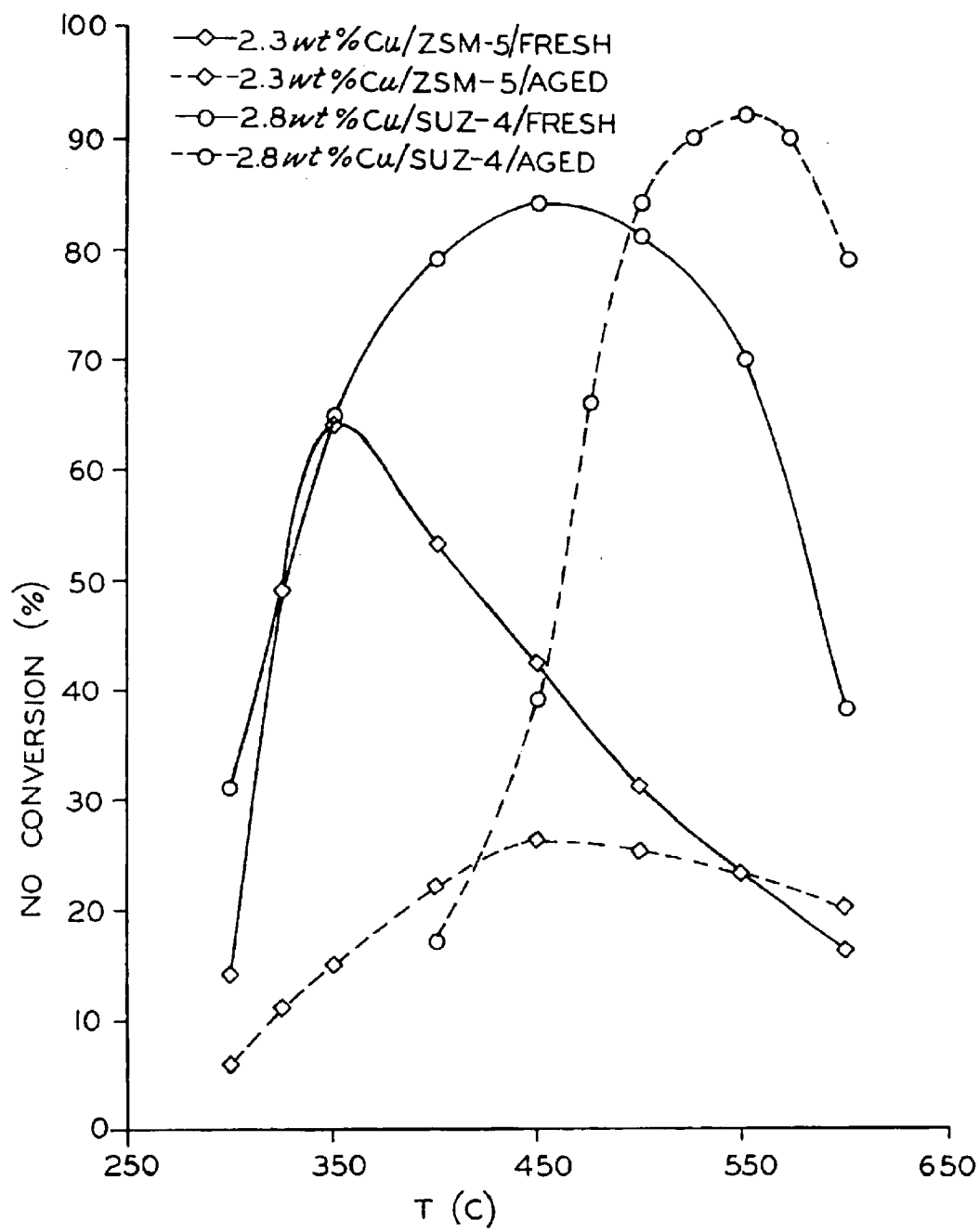
FIG. 3 is a graph of data showing a comparison of NO conversion between fresh/aged Cu/ZSM-5 and Cu/SUZ-4 catalysts.

FIG. 3 compares NO conversion activity of the fresh and aged 2.3 wt % Cu/ZSM-5 and 2.8 wt % Cu/SUZ-4 catalysts. For the Cu/ZSM-5 catalyst, the maximum conversion is 64% at 350° C. Aging the Cu/ZSM-5 catalyst severely depresses the NO conversion activity, reaching a maximum of only 24% at 450° C. On the other hand, the fresh Cu/SUZ-4 catalyst has higher activity than the fresh Cu/ZSM-5 especially in the high temperature regime above 350° C. The fresh Cu/SUZ-4 catalyst maintains a wide temperature window from 350 to 600° C. with a maximum NO/NOx conversion of 84% at 450° C. Interestingly, aging the Cu/SUZ-4 catalyst decreases the low temperature activity (i.e., <500° C.) while increasing the high temperature activity. For both the fresh and aged, it is clear that Cu/SUZ-4 is much more active for NO conversion than Cu/ZSM-5.

Figure 4:
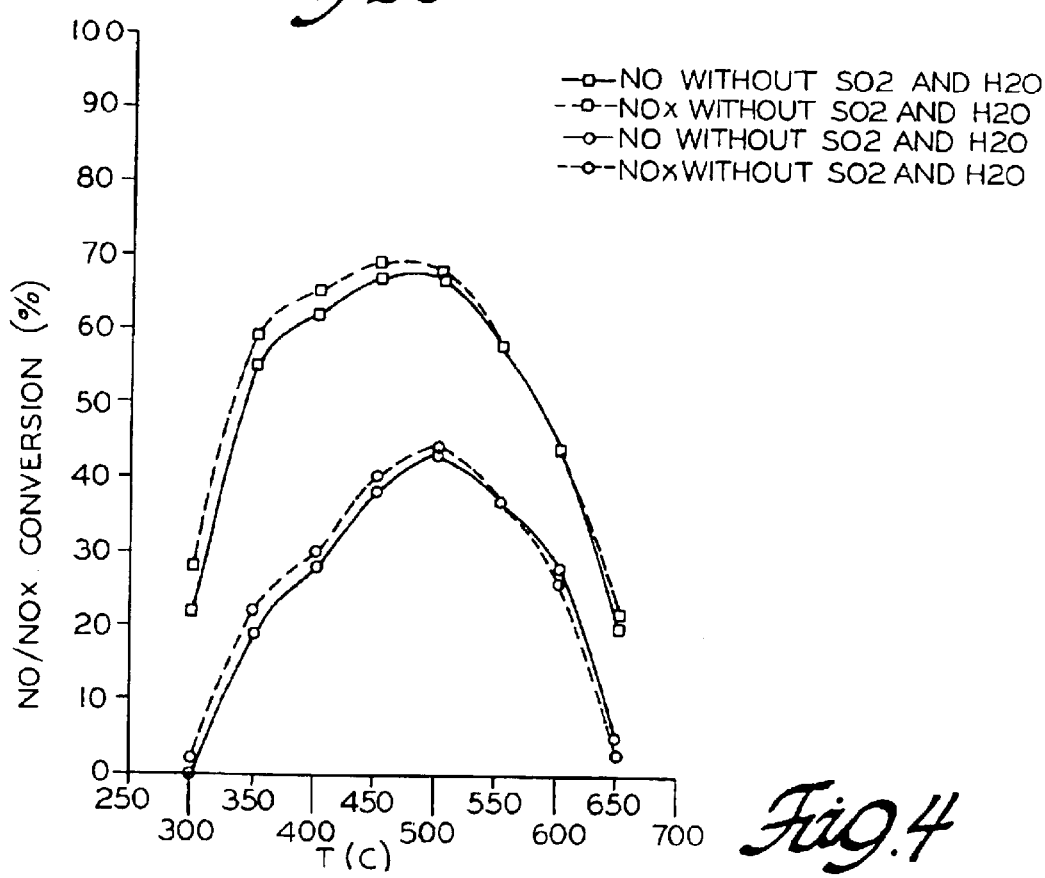
FIG. 4 is a graph of data showing the effect of $H_2O/SO_2$ on fresh 2.3 weight % Cu/SUZ-4 for NO and NOx conversion.

The combined effect of both $SO_2$ and $H_2O$ on NO and NOx conversions for the fresh 2.3 wt % Cu/SUZ-4 as a function of temperature is shown in FIG. 4. The effect of $H_2O/SO_2$ resembles very much the effect due to either $H_2O$ or $SO_2$ alone on the catalyst; the NO/NOx conversion decreases by 25% from 68% to 43% at 500° C. in the presence of both $H_2O$ and $SO_2$.

Thus, a family of new metal-exchanged SUZ-4 zeolite catalysts have been provided for the chemical reduction of NOx in an hot oxidizing gas stream such as the exhaust from a hydrocarbon fuelled engine operated under fuel lean conditions. Suitable members of the family include Co/SUZ-4, Cu/SUZ-4, Fe/SUZ-4 and Ag/SUZ-4 zeolites. Each has the capability of reducing NO in a hydrocarbon and oxygen containing gas. All of these materials are stable under extreme hydrothermal conditions. The copper exchanged SUZ-4 zeolites are particularly effective in reducing all NOx over a broad temperature range even when the NOx containing gas also contains water and sulfur dioxide.

The invention has been described in terms of certain preferred embodiments. But other forms of the invention could be devised by those skilled in the art and the scope of the invention is to be limited only by the following claims.

What is claimed is:

1. A NOx reduction catalyst for a hydrocarbon-fueled automotive engine operated at a fuel lean air-to-fuel ratio, said catalyst consisting essentially of a cation exchanged SUZ-4 zeolite, said zeolite having a Si/Al ratio of 5.1–6 and having potassium cations that have been partially exchanged with Cu (II).

2. The NOx reduction catalyst as recited in claim 1 in which the metal cation content consists essentially of 29 to 42% copper ions on the ion exchange capacity basis of said zeolite, and the balance said potassium cations.

* * * * *